(12) United States Patent
Skultety-Betz et al.

(10) Patent No.: US 8,546,759 B2
(45) Date of Patent: *Oct. 1, 2013

(54) INFRARED LOCALIZATION DEVICE HAVING A MULTIPLE SENSOR APPARATUS

(75) Inventors: Uwe Skultety-Betz, Leinfelden-Echterdingen (DE); Bjoern Haase, Stuttgart (DE); Michael Mahler, Leinfelden-Echterdingen (DE); Ulli Hoffmann, Nieffern-Oeschelbronn (DE); Reiner Krapf, Reutlingen (DE); Christoph Wieland, Herrenberg-Kuppingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/587,384

(22) PCT Filed: Dec. 15, 2004

(86) PCT No.: PCT/EP2004/053493
§ 371 (c)(1),
(2), (4) Date: Jun. 8, 2007

(87) PCT Pub. No.: WO2005/080930
PCT Pub. Date: Sep. 1, 2005

(65) Prior Publication Data
US 2007/0296955 A1    Dec. 27, 2007

(30) Foreign Application Priority Data
Feb. 14, 2004    (DE) .......................... 10 2004 007 316

(51) Int. Cl.
*G01J 5/34*    (2006.01)
*G01J 5/10*    (2006.01)

(52) U.S. Cl.
USPC .................................... 250/339.05; 250/358.1

(58) Field of Classification Search
USPC ............................... 250/336.1, 339.05, 358.1
See application file for complete search history.

(56) References Cited

U.S. PATENT DOCUMENTS

| 4,099,118 A | 7/1978 | Franklin et al. |
| 5,307,272 A | 4/1994 | Butler et al. |

(Continued)

FOREIGN PATENT DOCUMENTS

EP    0 520 666    6/1992

OTHER PUBLICATIONS

Foessel et al., Radar Sensor for an Autonomous Antarctic Explorere, Jan. 1999, Mobile Robots XIII and Intelligent Transporation Systems, vol. 3525, pp. 117-124.*

(Continued)

*Primary Examiner* — David Porta
*Assistant Examiner* — Carolyn Igyarto
(74) *Attorney, Agent, or Firm* — Kenyon & Kenyon LLP

(57) ABSTRACT

A measuring device, in particular a handheld measuring device, for the localization of objects enclosed in a medium, including at least one photometric sensor that obtains by way of the at least one photometric sensor a first measurement signal of the object to be examined, so that by evaluation of that measurement signal, information about an object enclosed in the medium is obtained, and at least one further sensor, for generating at least one further second measurement signal for obtaining information about the object enclosed in the medium. A method for the localization, by way of a photometric sensor, of objects enclosed in a medium.

10 Claims, 3 Drawing Sheets

(56) References Cited

U.S. PATENT DOCUMENTS

| | | | |
|---|---|---|---|
| 5,680,048 A | 10/1997 | Wolny | |
| 5,945,825 A * | 8/1999 | Clemens | 324/252 |
| 5,952,957 A * | 9/1999 | Szu | 342/53 |
| 6,341,551 B1 * | 1/2002 | Comeyne | 89/1.13 |
| 7,034,677 B2 * | 4/2006 | Steinthal et al. | 340/539.12 |
| 7,956,794 B2 * | 6/2011 | Skultety-Betz et al. | 342/22 |
| 2003/0193429 A1 * | 10/2003 | Campana et al. | 342/22 |
| 2005/0262995 A1 * | 12/2005 | Kilkis | 89/1.13 |
| 2006/0284758 A1 * | 12/2006 | Stilwell et al. | 342/22 |

OTHER PUBLICATIONS

PC Literatur 1: Amazeen C A et al: "US Army's new handheld standoff mine detection system (HSTAMIDS)" The Detection of Abandoned Land Mines: A Humanitarian Imperative Seeking a Technical Solution, Eurel International Conference on (Conf. Publ. No. 431) Edinburgh, UK Oct. 7-9, 1996, pp. 172-176, XP006510335.

* cited by examiner

Fig. 2
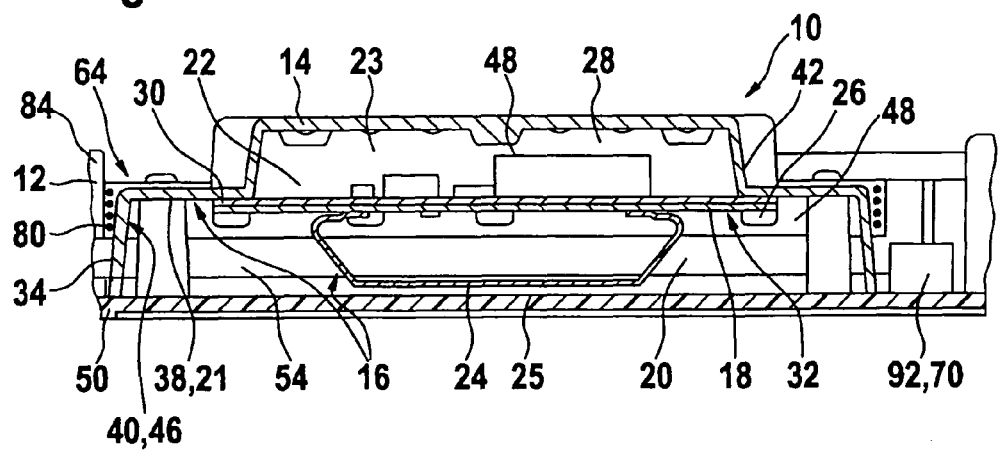
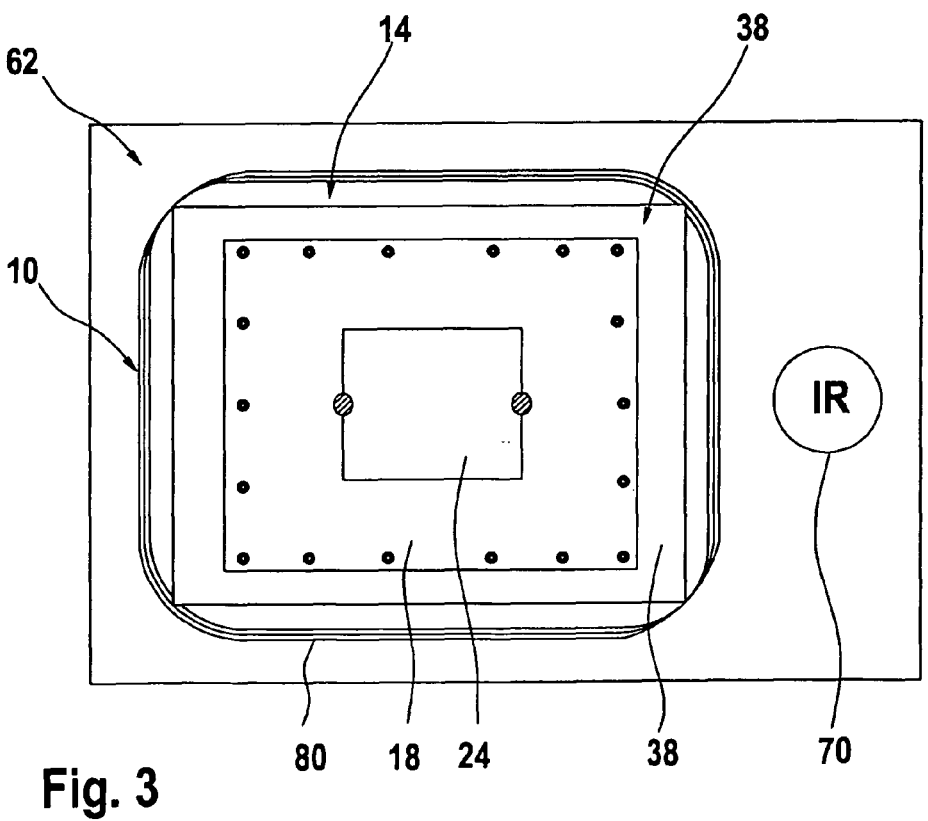
Fig. 3

INFRARED LOCALIZATION DEVICE HAVING A MULTIPLE SENSOR APPARATUS

FIELD OF THE INVENTION

The present invention relates to an infrared measuring device, in particular a handheld measuring device, for the localization of objects enclosed in a medium, and to a method constituting the basis for the measuring device. A measuring device of this kind uses an infrared sensor apparatus that detects thermal radiation emitted from an object to be examined. An object enclosed in a medium is detected, and thereby localized, because its thermal properties are different from those of the surrounding medium. Information about the object enclosed in the medium can be obtained by evaluating the detected signal.

BACKGROUND INFORMATION

Infrared sensors (hereinafter also referred to as IR sensors) can advantageously be used wherever temperatures or temperature differences must be measured. This is the case, for example, in security technology, where approaching persons are sensed by an IR sensor as a result of their body heat, and on that basis, for example, a light is switched on or an alarm triggered. Modern fever thermometers also usually contain an IR sensor, which quickly and reliably measures body temperature via a measurement in the ear.

The advantage of temperature measurement using IR sensors is that even very high temperatures (above 1000 degrees) can be reliably measured, because such a measurement is performed in non-contact fashion, solely on the basis of radiated heat. EP 1 176 407 A2 discusses one such apparatus for non-contact temperature measurement.

The use of an infrared measuring device is also of interest, for example, in scenarios such as underfloor heating systems, heating pipes, etc., i.e. for the surveying of water pipes that are enclosed in floors, walls, or ceilings. Here it might be desirable, for example, to know where the pipes are located so as not to drill into the pipes, or in order to determine the exact location of the pipes if a water-pipe break has already occurred.

Such instances are at present investigated using IR sensor devices, thermal imaging cameras, or thermal films. With such IR sensor devices of the existing art, the region to be examined is slowly scanned and the local temperature maxima are indicated. Thermal imaging cameras generate, in principle, photographs in the infrared region, which can make slight temperature differences visible. Thermal films are made of a temperature-sensitive material that changes color at higher temperatures; the films are intended to be adhered onto the area to be examined. Such methods, some of which are also direct-imaging methods, are collectively referred to as thermography or thermal image recording.

Both passive and active thermography for nondestructive structural diagnosis is known, for example, from the conference paper "Use of active thermography for the detection of inclusions in building structures and in soil" ("Einsatz aktiver Thermographie zur Detektion von Einschluessen in Baukonstruktionen und im Erdreich") that was presented in the context of the DGZfP Thermography Colloquium in Stuttgart in 2001.

In passive thermography, only the internal quantity of heat radiated from an object being examined is used for measurement. In active thermography, the object being examined is heated actively, i.e. from outside, prior to the examination, and after the external heat source is switched off, the quantity of heat radiated from the object is then detected.

A disadvantage of these thermography methods may be, for example, that an underfloor heating system to be examined should already have been switched off hours before the measurement and should be started up again only shortly before the measurement, so that the temperature difference between regions with and without pipes is sufficiently large. In addition, active thermography requires that not inconsiderable quantities of radiated energy may need to be generated and radiated onto the object.

Because these devices can indicate only temperature distributions, the devices may not be very accurate. External influences such as drafts or room temperature, or also structural features such as, for example, increased thermal diffusion in the floor, can falsify the measured values.

IR sensor devices themselves, and especially thermal imaging cameras, may also be very expensive, since it is believed that they must be very accurate in order to be able to define at least the approximate location of, for example, pipes in concrete.

SUMMARY OF THE INVENTION

The measuring device according to the exemplary embodiment and/or exemplary method of the present invention having a photometric sensor, in particular an infrared (IR) sensor, and the underlying method for the localization of objects enclosed in a medium, process at least one further measurement signal in addition to the measurement signal of the at least one photometric sensor. An infrared sensor is advantageously used as the photometric sensor. The infrared sensor of the measuring device according to the exemplary embodiment and/or exemplary method of the present invention is made up, for example, of a semiconductor photodiode whose conductivity changes with the incident radiation intensity, this photodiode being sensitive specifically to wavelengths in the region above 1 micrometer (infrared radiation).

In addition to the measurement signal of a photometric sensor, the exemplary method according to the present invention furthermore evaluates at least one further, additional measurement signal. With the aid of this additional measurement signal, it is advantageously possible to obtain additional information about the enclosed object that is to be examined.

The exemplary method according to the present invention thus also advantageously makes possible, in addition to the mere localization of objects, for example a quantitative determination of the depth at which an object is enclosed in a medium. Such information cannot be obtained by way of a purely photometric sensor.

The claimed measuring device furthermore also makes possible an identification of the material of the enclosed object. Different materials can thus be distinguished in simple fashion. It is thus possible, for example, to detect whether the heating pipes of an underfloor heating system are metal pipes or, as more commonly used today, plastic pipes.

If a measuring device of this kind according to the present invention is used, for example, before drilling into a wall or a floor, then in addition to mere localization of the object, it is also already possible to make, in advance, a prediction as to the "hazardousness" of the objects enclosed in the medium. For example, current-carrying conductors can be distinguished, as applicable, from wooden beams or the like. The features set forth in the dependent claims make possible advantageous refinements of the exemplary method according to the present invention in accordance with claim 1.

In an embodiment of the measuring device, and of the exemplary method underlying the measuring device, according to the present invention, the at least one further measurement signal that is employed for evaluation and information recovery is generated by at least one further sensor. The use of separate sensors for the different detected signals makes it possible to perform the measurements in parallel, not the least of the consequences thereof being a reduction in measurement time.

A corresponding circuit switches in not only the photometric sensor of the measuring device (which sensor is advantageously embodied as an IR sensor) but also, as necessary, a further sensor, for example a radar sensor or a capacitive sensor. The driving system of the sensors can be modulated, for example, in such a way that an infrared signal or a radar signal is detected alternatingly, for example in rapid succession ("quasi-parallel" operating mode).

According to a particularly advantageous exemplary embodiment, with an appropriate manner of driving, the antenna panels of the radar sensor can also be used as electrodes of a measuring capacitor. The antenna assemblage of the radar sensor, and the associated driving signal, can be modulated in such a way that driving switches back and forth between high-frequency excitation and the low-frequency operating mode. For example, high-frequency capacitive sensors or also usual low-frequency sensors, such as those used e.g. in stud finders, can thus be constituted, depending on the excitation signal, using only one electrode of an additional sensor.

It is also possible, for example, to drive the antenna of the radar sensor according to the present invention in such a way that it works in the manner of a line voltage detector, which can capacitively sense the alternating voltage field of, for example, a line voltage conductor. In this case the antenna would work passively, i.e. without generating an electric field, and thereby make it possible to indicate the location and course of line voltage conductors, for example, in walls.

With the exemplary method according to the present invention it is therefore possible, using an infrared sensor and only one additional sensor that nevertheless is differently driven, to generate a number of different detected signals that, by the evaluation thereof, make additional information about an enclosed object available to the user of a corresponding measuring device.

The use of additional measurement signals permits more accurate localization of the enclosed objects, since the infrared sensor generating the first measurement signal can be optimized, and adapted to the specific measurement situation, based on the measurement results of a second sensor. For example, a capacitive sensor recognizes a wooden single-panel wall by measuring the dielectric impedance. The radar sensor integrated into the device can then be operated so that air inclusions are measured, but are not displayed on the device's display. This can be achieved, for example, by the fact that the signal processing system downstream from the radar sensor averages out the signals of the air inclusions using ordinary averaging methods. In this fashion the radar sensor can be operated in optimized fashion.

A distinction between metallic and non-metallic objects is thus possible with an inductive sensor, so that e.g. a distinction among various pipe materials becomes possible. Preliminary calibration of inductive sensors can thereby be omitted, since it can be, for example, performed automatically if, for example, a radar sensor that is present recognizes that no object is present in what is being examined.

The exemplary method according to the present invention also makes it possible, advantageously, to search in directed fashion for specific objects. By way of a corresponding circuit that activates a predefined search routine, for example, a search can be made specifically for electrical cables or metals. The detection of current-carrying cables is also possible in principle using only an infrared sensor, but the necessary accuracy is not achieved with such a system. With an additional sensor, electrical cables or other metals can be detected simply and reliably. Cavities likewise present in the wall, or other objects that do not correspond to the criteria, can then advantageously be, for example, blanked out on the display of the measuring device, so that a user receives only the desired information.

With the exemplary method according to the present invention it is thus possible to depict on the display of the measuring device, for example successively or simultaneously, metal pipes and plastic pipes, current-carrying electrical conductors, plastics, or even cavities or objects made of wood. It is thus possible to perform material thickness measurements, for example concrete coverage in the case of reinforced concrete structures, or plaster thickness measurements in the context of underfloor heating systems, with the measuring instrument according to the present invention. This determination of the material coverage is not possible with conventional infrared measuring devices.

In an exemplary method according to the present invention, the detected signals of an entire series of sensors are employed for evaluation. In addition to the infrared sensor these sensors can be, for example, radar sensors, capacitive sensors, inductive sensors, or even ultrasonic sensors. These sensors are interconnected individually or in groups. This can be done, for example, under manual or automatic control, i.e. by a corresponding routine that is stored in a memory element of the measuring device.

In an advantageous evaluation routine of the exemplary method according to the present invention, provision can be made to evaluate the detected signals of all active sensors and to use only those having an unequivocal signal exclusively for subsequent data processing. The measurement results of the other sensors would be ignored in this context. If an inductive sensor detects in the floor, when surveying an underfloor heating system, not only the water pipes likewise identified by the infrared sensor but also metal objects of divergent size, the weaker signals could then be blanked out, since they very probably result from a structural steel mat present in the floor. If, however, the inductive sensor recognizes only one type of metal object, and if a radar sensor also detects no additional objects, then the signals detected by the inductive sensor are the metal pipes of the underfloor heating system. If, however, an additionally present radar sensor detects further objects, these additional objects are plastic pipes of the underfloor heating system. The metal objects can then once again be blanked out on the display of the measurement results. It is possible in this fashion to make only the relevant information visible.

It is also possible in particular, in advantageous fashion, to optimize a sensor, or a sensor' detected signal used for measurement, by way of the evaluation and findings of the at least one further detected signal. In one exemplary method according to the present invention, for example, provision is made to write into the driving system of the individual sensors various respective "programs," for example a "metal program," a "hollow tile program," a "plastic program," etc. These specific search programs can be allocated to individual sensors that have specific advantages for the detection of such an object. When a specific programmed scenario is detected in the context of a measurement by one or more sensors, i.e. when one or more sensors give indications of, for example, a specific material, then all the sensors are set to that program, and the sensor driving and evaluation are optimized for the material that has now been recognized. More accurate results can thereby be supplied because it is possible to work, for example, with sensitivities for the individual sensors that are matched optimally to the identified object.

In a further embodiment of a measuring device according to the present invention, multiple sensors are integrated into a common housing of the measuring devices. The sensors can be, for example, disposed on a common circuit board. It is advantageous, for example, to align all the sensors on one common axis, so that the corresponding detected signals are directed onto one and the same point.

If the device possesses a displacement sensor apparatus, then not only can the present signal level of the various sensors be measured, but signal profiles can moreover also be acquired and depicted. This also makes possible a two-dimensional presentation in the display of the measuring device, in which a depth datum is displayed in addition to a displacement datum. This differs advantageously from infrared localization devices of the existing art in which the present measurement result at the measurement location is in most cases displayed via a false-color depiction. With the measuring device according to the present invention it is thus possible, for example in the context of an underfloor heating system, to detect and display not only the material of the pipes, their size and their depth in the floor, but also, by way of the differing temperature level, the direction of flow.

In alternative embodiments of the measuring devices according to the present invention, however, it is also possible to integrate the sensors in part on a common circuit board and in part at other locations in the housing of the measuring device, for example in a housing base of the device.

A particularly advantageous configuration of the measuring device results from the use of external sensors that can be coupled, via a plug-in module and a corresponding interface, to the measuring device and to the sensors present therein.

For example, provision can also be made for integrating an entire series of different sensors into the measuring device during the manufacture of that device, and to enable those sensors for driving, individually or in groups, via corresponding software. It is possible in this fashion to take into account different requirements of various users with one series-produced product.

The infrared measuring device according to the present invention is thus embodied as a cost-saving, compact, multi-function device that advantageously permits easy, handheld operation by the fact that the user moves the measuring device, for example, over a wall that is to be examined. The measurement results are presented to the user in an intuitively and easily accessible graphical depiction, directly on a display of the measuring device, so that the user can take a direct look into the wall being examined and can thus decide, for example, the point on the wall at which a drill hole is not hazardous.

Further advantages of the exemplary method according to the present invention for the localization of objects enclosed in a medium and of a corresponding measuring device, are disclosed in the drawings below and in the relevant description.

Exemplary embodiments of the infrared localization device according to the present invention, and of the underlying method for the localization of objects enclosed in a medium, are depicted in the drawings, and will be explained in further detail in the description that follows. The Figures of the drawings, their descriptions, and the claims contain numerous features in combination. One skilled in the art will also consider these features individually, and combine them into further desirable combinations that are herewith to be regarded as likewise being disclosed in this text.

BRIEF DESCRIPTION OF THE DRAWINGS

FIG. 2 shows a section through the sensor apparatus of a first exemplary embodiment of the measuring device according to the present invention.

FIG. 3 shows the exemplary embodiment of the measuring device according to the present invention in accordance with FIG. 2, in a schematic view from below.

DETAILED DESCRIPTION

Figure 1:
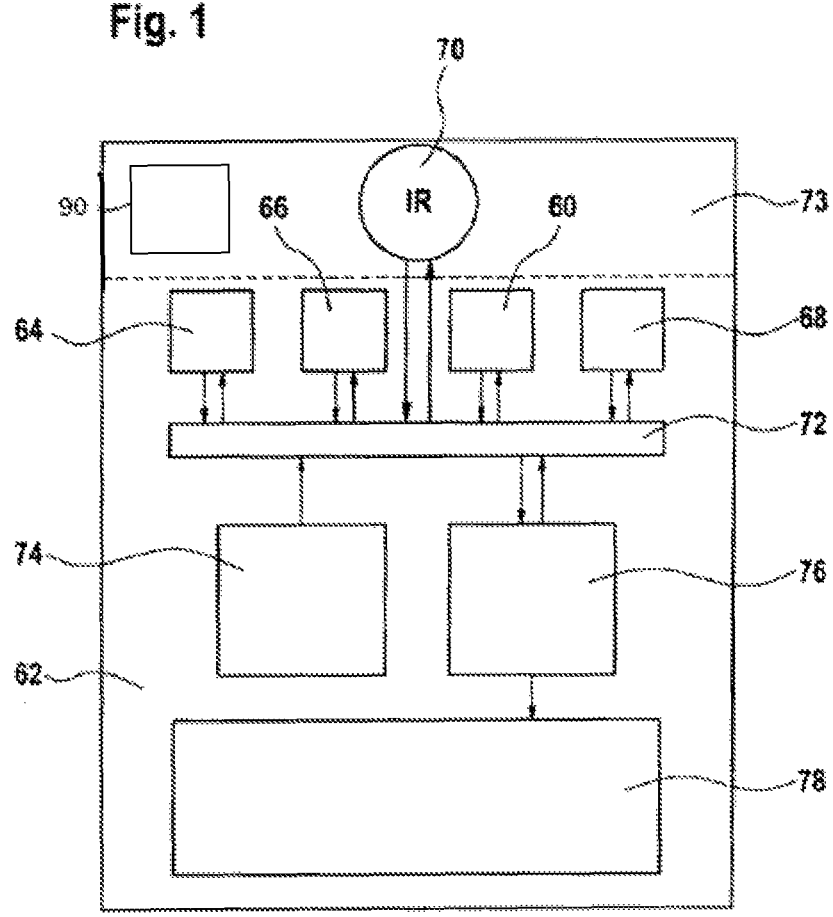
FIG. 1 schematically shows the construction of a measuring device according to the present invention.

FIG. 1 schematically depicts the exemplary method underlying the invention and the construction principle of a photometric measuring device for the exemplary method according to the present invention. In addition to an infrared sensor 70, measuring device 62 according to the present invention has, in the exemplary embodiment of FIG. 1, an inductive sensor 64, a capacitive sensor 66, a high-frequency capacitive sensor 68, and a radar sensor 60. Infrared sensor 70 represents an advantageous photometric sensor 92. Further sensors can be present in corresponding exemplary embodiments.

Whereas in the context of a measurement, the infrared sensor can perform a rough classification that makes possible, for example, an initial statement as to heated, unheated, or cooled pipes, and can make the approximate course of those pipes visible, more accurate information as to the exact location, depth, and size of the enclosed objects can be obtained by way of the further sensors present in the measuring device. In the context of this description, the aforesaid pipes of an underfloor or in-wall heating system may serve as an illustrative example for presenting the manner of operation of the measuring device according to the present invention. Reference to these pipes does not in any way constitute a limitation, however, since the measuring device according to the present invention, as well as the exemplary method according to the present invention on which the measuring device is based, serve for the localization of any objects enclosed in a medium.

The individual sensors as depicted in FIG. 1 are driven and evaluated by way of a central control unit 72 of the measuring device according to the present invention. In the exemplary method according to the present invention, the sensors can be connected both individually and in groups, or all together. The choice of an operating mode, i.e. selection of the sensors that are to be used for a specific measurement, can be made on the one hand via a manual operating mode switch 74 that is integrated into a control panel, for example a keyboard or a program menu of the measuring device, and can be actuated by a user as he or she chooses.

In addition to this manual selection of the operating mode by the user, an automatic operating mode selection ("automatic mode") by way of a corresponding control program is also possible; that program can be stored in a memory medium of the measuring device.

The exemplary method according to the present invention makes it possible to use the various sensors in parallel, quasi-parallel, and serial fashion. In the quasi-parallel operating mode, operation is switched over very quickly between individual sensors, and the corresponding detected signals are generated, measured, and evaluated or (if applicable) stored temporarily for evaluation. Here as well, a choice can be made between an automatic selection of the sensors and one defined by the user.

By way of a corresponding evaluation unit 76, the individual measurement signals of the sensors are evaluated and compared with one another, and thereupon, for example, individual sensors are optimized as a function of the measurement results of other sensors. In one exemplary method according to the present invention, for example, provision is made to write various respective "programs" into the driving system of the individual sensors, for example a "metal program," a "hollow tile program," a "plastic program," etc. Specific search programs of this kind can be allocated to the individual sensors. When a specific programmed scenario is recognized in the context of a measurement by one or more sensors, i.e. when certain sensors provide indications as to, for example, a specific material, then all the sensors are switched to that program and thus supply more accurate, optimized measurement results, since it is possible, for example, to work with optimally coordinated sensitivities of the individual sensors.

In an advantageous evaluation routine of the exemplary method according to the present invention, provision can be made to evaluate the detected signals of all active sensors and to use only those having an unequivocal signal exclusively for subsequent data processing. The measurement results of the other sensors are ignored for further evaluation in this context.

A unit for data processing and a display 78 are located after evaluation unit 76. The data of evaluation unit 76 are processed and are converted into a type of presentation that is intuitively accessible to the user. For example, the measurement result can be processed in the form of a graphical depiction of the current measurement situation. By way of a display integrated into the measuring device, the measurement signal is transmitted to the user, in particular in real time, for example in the manner of a sectioned depiction through the wall being examined.

In the context of data processing, provision can be made, for example, to evaluate all the sensor signals by principal-component analysis of neural networks and, via a pattern recognition system, to output the most probable result via the display. A corresponding routine can also be provided which causes each sensor to influence the result in weighted fashion in accordance with its detection limits. This makes possible an overall result having "soft" limits, even though each individual sensor has its own defined detection limits. The use of fuzzy logic, for example, is advantageous here.

The individual sensors provided for the exemplary method can all be integrated into a housing of the measuring device, or it is also possible to implement specific adaptive variants of the measuring device according to the present invention. Additional detectors, for example inductive sensor 64, could be placed in modular fashion onto measuring device 62 having infrared sensor 70, radar sensor 60, high-frequency capacitive detector 68. Inductive sensor 64 can also be driven and evaluated by the actual measuring device 62 via a common interface.

FIG. 2 shows a section through the front end, i.e. sensor head 10, of a measuring device according to the present invention. Measuring device 62, only portions of which are depicted in the exemplary embodiment of FIG. 2, has an infrared sensor 70 as photometric sensor 92, as well as a radar sensor 60 and an inductive sensor 64 in the form of a coil.

Sensor apparatus 10 possesses a housing 14 having a conductive surface. Housing 14 can be produced, for example, from a metal as an integral die-cast part, or also from metallized plastic by way of a shaping process. Metallic conductive coatings for housing 14 of the sensor apparatus are likewise possible. The housing of the sensor is open on one side in the direction of a measured object, surrounds essential components of the sensor apparatus, and is itself an integral constituent of that sensor apparatus.

Sensor apparatus 10 has substantially four component groups. The first group of these components are electrical circuits 48 for generating and processing the measured or detected signals. The second subassembly of the sensor apparatus encompasses a radar sensor 60 that is implemented, in the localization device according to the present invention, by a specifically configured antenna 16. Provided around housing 14 of the sensor apparatus as a third subassembly is a coil assemblage 12 that, together with corresponding electronic circuits and components 48, constitutes an inductive sensor 64 for detecting, in particular, metallic objects. The fourth component group is constituted by an infrared measurement head 69 with its sensor 70.

The aforesaid four different subassemblies are disposed in different sub-spaces, separated from one another, of sensor head 10. Whereas coil assemblage 12 of inductive sensor 64 extends outside housing 14, electrical circuits 48 and the antenna of radar sensor 60 are disposed inside the housing, although separated from one another by a circuit board 18. In the exemplary embodiment of FIG. 2, infrared measurement head 69 is disposed outside housing 14 in the vicinity of the inductive sensor. A separation of the infrared sensor head from the power electronics is particularly advantageous, since the waste heat from the electronic components could result in distortion of a measurement result. The infrared sensor is electrically coupled, via a corresponding connecting arrangement, to the energy supply and to the driving electronics.

Circuit board 18 is secured at its edges in housing 14 to housing 14. The housing possesses for that purpose, in the exemplary embodiment according to FIG. 2, a characteristic shoulder 42 onto which circuit board 18 is laid. Housing 14, shaped in that fashion, is installed in a housing (not depicted in further detail) of the measuring device in such a way that the two sub-spaces for the electronics and the radar sensor are disposed one above another. Sub-spaces 20 and 22 are separated from one another by circuit board 18 in such a way that a first open sub-space 20 for the radar sensor and a second closed sub-space 22 for the electronic components are formed. Second sub-space 22 is formed by a protrusion 28 of housing 14 and by circuit board 18, which is joined immovably to the housing. Advantageously, a metallized layer 30 is integrated on or in circuit board 18 so that sub-space 22 of housing 14 is enclosed by an electrically conductive surface. Sub-space 22 thus constitutes a "Faraday cage" 23 that enables the electronic components disposed in sub-space 22 to be insulated from electromagnetic interference. The electronic components are thereby in turn decoupled from the sensors, and thus do not cause any negative interaction with them.

As is evident from FIG. 2, circuit board 18 carries on its one side the electrical circuits and components 48 for generating and evaluating the measurement signals. The individual sensors are connected via corresponding a connecting arrangement to electronic components 48 in the second sub-space. An antenna panel 24 of antenna 16 is mounted on the other side of circuit board 18.

First sub-space 20 of housing 14 of sensor apparatus 10, in which sub-space radar sensor 60 is housed, is constituted substantially by surface 32 of circuit board 18 and by side walls 34 of housing 14. Integrated into side walls 34 are cutouts 36 that enable housing 14 of the sensor apparatus to be anchored into the housing of the measuring device.

First sub-space 20 of housing 14 is opened on one side through an opening 54, and substantially carries antenna 16 of radar sensor 60. The antenna is constituted by antenna panel 24 mounted on circuit board 18, and by inner surface 38 of sub-space 20 of housing 14, which surface constitutes ground electrode 21 of the antenna assemblage. Thus the configuration of antenna 16 may be very compact.

As depicted in the exemplary embodiment of FIG. 2, first sub-space 20 can be closed off by a wall 50 of the associated measuring device 62 in the manner of a radome, provided this partition does not present any impediment to the electric field of antenna assemblage 16. For that reason, wall 50 can be implemented, for example, by one side of a plastic housing of measuring device 62 according to the present invention. Infrared sensor 70 can likewise, if applicable, be protected by this housing wall of the measuring device. Wall 50, in addition to protecting infrared measurement head, also mechanically protects antenna panel 24 of radar sensor 16 from damage.

In this case measuring device 62 according to the present invention would be guided, with housing wall 50, over the structure to be surveyed, for example a ceiling or a floor. Rollers or other rolling elements, with which the measuring device can be moved, for example, over a wall, can be provided for that purpose on the measuring device. The measuring device according to the present invention possesses a displacement sensor apparatus so that the distance traveled with the measuring device along a wall or the like can be measured. Not only may the instantaneous signal levels of the various sensors be measured, but signal profiles moreover can be acquired and displayed by associating a local coordinate with each measured value. A two-dimensional presentation on the display of the measuring device may be provided, depicting a depth datum as well as a displacement datum. This differs advantageously from infrared measuring devices of the existing art, in which usually only the present measurement result at the present measurement location is displayed via one or more optical signal lamps.

Coil elements 80 of coil assemblage 12 of an inductive sensor 64 in the measuring device according to the present invention are wound around housing 14 of sensor apparatus 10. Coil elements 80 can, for example, be mounted on a coil former 84 or encapsulated into it. Coil elements 80 are connected via a corresponding connecting arrangement to an energy supply (not depicted in further detail) and to electronic components 48 for driving and evaluation. In other embodiments, for example, the inductive sensor apparatus may be integrated into plastic base 50 of measuring device 62.

Infrared sensor 70 can also be located inside housing 14, for example on sensor circuit board 18. Because of mutual influences between sensors, however, it is typically better to place it outside the housing, as depicted in FIG. 2.

In an advantageous embodiment of the measuring device according to the present invention, provision is made to configure infrared sensor 70 in the form of a removable IR sensor head 73, and to provide it as an additional component 73 for a corresponding radar-sensor measuring device. Infrared sensor 70 can then be coupled, via a corresponding interface on the localization device, to the control and evaluation unit of the measuring device, and can also be driven and evaluated thereby.

The manner of integration of the sensor principles that are used can be implemented as desired in different exemplary embodiments of the measuring device according to the present invention. The location, size, and number of the sensors are not limited. The data obtained from the additional detected signals can be further processed in profitable fashion, and thus result in additional information about the enclosed object.

FIG. 3 is a simplified and schematic view from below of sensor head 10 of a measuring device according to the present invention in accordance with FIG. 2, with protective wall 50 removed. Antenna panel 24 of antenna 16 is mounted approximately centeredly on sensor circuit board 18. Disposed around housing 14 are coil elements 80 of inductive sensor 64 of the measuring device according to the present invention. IR sensor 70 is located outside housing 14 of the radar antenna assemblage.

In the context of the exemplary method according to the present invention, a corresponding circuit also to operate antenna 16 of radar sensor 60 may be used as an ordinary, i.e. low-frequency, capacitive sensor 66, in the manner of a stud finder. The driving system of antenna 16 can be modulated for that purpose, for example, in such a way that it is switched back and forth between high-frequency excitation and the low-frequency operating mode. Also, for example, antenna assemblage 16 of the localization device may be driven according to the present invention as shown in FIG. 2 and FIG. 3 in such a way that it is operated in the manner of a line voltage detector 65 that can capacitively sense the AC voltage field of, for example, a line voltage conductor. In this case the sensor would work passively, i.e. without generating an electric field, thus allowing the indication of the location and course of line voltage conductors e.g. in walls.

The driver electronics provided in the measuring device according to the present invention allow the generating of a variety of additional measurement signals or detected signals using only one sensor, in the exemplary embodiment of FIG. 2 or 3 using antenna assemblage 16 of radar sensor 60. These measurement signals can then be evaluated in quasi-parallel or even serial fashion, so that by way of the evaluation, additional information can be obtained about the object that is enclosed in a medium and is to be surveyed. Radar sensor 60 can be driven as a capacitive sensor, in particular as a conventional, i.e. low-frequency, capacitive sensor 66, as a line voltage detector 65, but also as a high-frequency detector 68. Advantageously, the detected signals are automatically directed toward one and the same point on the surface to be examined. The same measured region is thus always examined, i.e. even upon switchover of the detected signal. A measurement error resulting from the surveying of different spatial regions is almost ruled out in this exemplary embodiment of a measuring device according to the present invention. In this manner, the infrared measuring device according to the present invention may be equipped with a plurality of additional sensor apparatus without an intolerable increase in the installation space of the measuring device needed therefor. Despite the large number of detected signals that are possible with the device according to the present invention, it can be embodied as a compact, handheld measuring device.

In an alternative exemplary embodiment, it is also possible to allocated each of the different detected signals to an independent sensor, for example respectively to an antenna and a measuring capacitor, so that purely parallel operation of the additional sensor apparatus in order to obtain multiple detected signals is made possible at the cost of an overall size that is then somewhat larger. The infrared transmitter is operated serially or in quasi-parallel fashion with respect to the additional sensors.

The exemplary method according to the present invention also, in advantageous fashion, allows specific objects to be searched for in targeted fashion. For example, by way of a corresponding circuit 90 that activates a predefined search routine, a specific search can be made for warm or hot water pipes. Cavities present in the wall, which can be detected using the IR sensor with great difficulty if at all, can likewise be detected using the additional sensors, for example the radar sensor, and switched into or also blanked out again on the display of the measuring device, automatically or in a manner defined by the user, so that a user can selectively display only the desired information.

Figure 4:
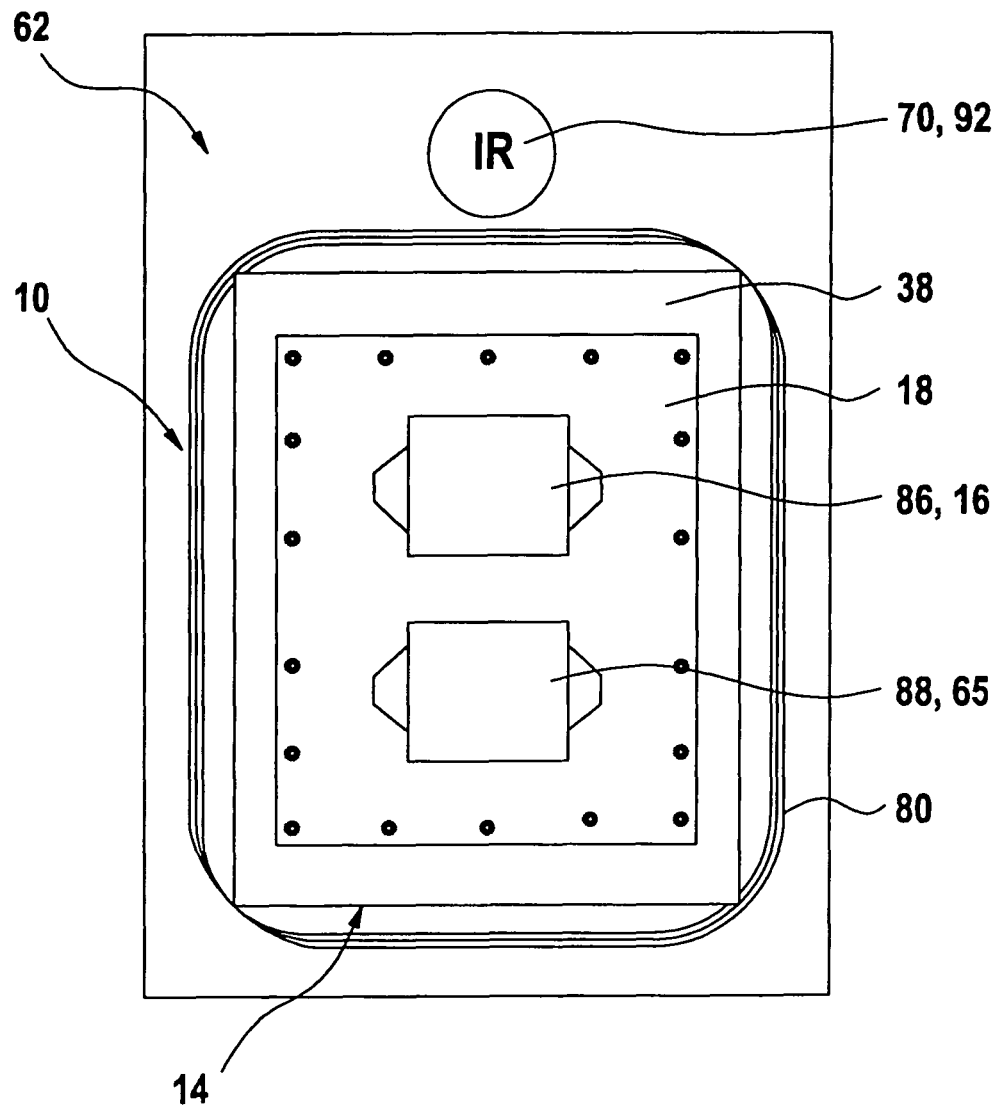
FIG. 4 shows a further exemplary embodiment of the measuring device according to the present invention, in a schematic view from below.

FIG. 4 shows a sensor apparatus 10 in a schematic view from below, the antenna assemblage of radar sensor 60 possessing a transmitting antenna 86 and a receiving antenna 88, separated from the transmitting antenna, that are soldered onto sensor circuit board 18. In addition to radar sensing, the antennas are also used by way of a corresponding electronic interconnection as a high-frequency capacitive sensor 68 or capacitive sensor 65, 66. For that purpose, intelligent software or corresponding electronics very rapidly switch over between the individual operating modes of these sensors. A coil assemblage 80 for inductive detection is furthermore wound around housing 14. A ferrite (core) can optionally be provided for the coil. The nature, size, and location of the coil windings can be specifically configured.

Infrared sensor 70 can also be located inside housing 14, for example on sensor circuit board 18. Because of the mutual influence among the sensors, however, it is typically better, as already mentioned, to place it outside the housing. The type of integration of the sensor principles that are used can be implemented in any fashion in different exemplary embodiments of the measuring device according to the present invention. The location, size, and number of the sensors are not limited. The data obtained from the additional detected signals can be profitably processed and thus result in additional information about the enclosed object.

By way of a corresponding data processing system (software), the measurement results of the individual sensors can complement one another and thus result in a maximally complete picture of the enclosed object.

In contrast to infrared devices of the existing art, the infrared measuring device according to the present invention makes possible by way of the combination of multiple sensor principles, for example, rapid and high-performance localization and surveying of heated or cooled pipes in walls, ceilings, or floors. Whereas the IR sensor can perform rough classification, i.e. a distinction between heated or cooled pipes and a determination of the approximate location of the pipes, the exact location, depth, and size of the pipes can also be determined by way of the further sensor principles integrated into the measuring device according to the present invention.

The evaluation of multiple detected signals that can be obtained from a combination of multiple sensors or by driving one and the same sensor in different ways advantageously makes it possible, in addition to localization of the enclosed object, also to obtain, for example, a material identification and, in the case of electrical conductors, also e.g. information about the voltage state of the conductors. The field of application of an infrared localization device is greatly expanded as a result of the additional sensor apparatus.

With the exemplary method according to the present invention it is possible to optimize a sensor on the basis of information about the enclosed object obtained by way of the other sensors. It is thereby possible for each sensor, considered of itself, to work better on the basis of the additional information from the other sensors. These optimized, mutually independent results can be combined in terms of software or hardware in such a way that the localization device according to the exemplary embodiment and/or exemplary method of the present invention can inform the user both as to location, depth, and width and, for example, about type of material and temperature, even at great object depths.

The measuring device according to the exemplary embodiment and/or exemplary method of the present invention having a photometric sensor is thus embodied as a cost-saving, compact, multi-function device that advantageously permits easy, handheld operation. For that purpose the user moves the measuring device, for example, over a wall that is to be examined. The measurement results are presented to the user in an intuitively easily accessible graphical depiction, directly on a display of the measuring device, so that the user can thereby take a "direct look" into the wall being examined. The user can thus decide, for example, the point on the wall at which a drill hole should not be made, or at which such a hole is not hazardous.

The localization device according to the exemplary embodiment and/or exemplary method of the present invention, and the underlying method according to the present invention for the localization of objects enclosed in a medium, are not limited to the exemplary embodiments shown in the Figures.

In particular, the exemplary method according to the present invention is not limited to the detection of objects enclosed in walls, floors, or ceilings.

What is claimed is:

1. A handheld measuring device for localizing at least one object enclosed in a medium, comprising:
   at least one photometric sensor that obtains a first measurement signal of the at least one object to be examined; and
   at least one further sensor for generating at least one further second measurement signal for obtaining information about the at least one object enclosed in the medium,
   wherein the at least one further sensor includes a radar sensor,
   wherein at least one antenna of the radar sensor is configured to be used as a capacitive sensor.

2. The measuring device of claim 1, wherein the at least one photometric sensor includes an infrared sensor.

3. The measuring device of claim 1, wherein the radar sensor includes a broadband sensor of a pulsed radar.

4. The measuring device of claim 1, wherein the at least one further sensor includes an inductive sensor.

5. The measuring device of claim 1, wherein the at least one further sensor includes a capacitive sensor.

6. The measuring device of claim 5, wherein the at least one further capacitive sensor includes a high-frequency capacitive sensor that, by measuring an impedance of its electrodes, obtains information about objects enclosed in the medium.

7. The measuring device of claim 1, wherein at least two of the sensors are integrated into a common housing of the measuring device.

8. The measuring device of claim 7, wherein at least two of the sensors are disposed on a common circuit board.

9. The measuring device of claim 1, further comprising a circuit that activates a predefined search routine.

10. The measuring device of claim 1, wherein antenna panels of the radar sensor are configured to be used as electrodes of the capacitive sensor.

* * * * *

UNITED STATES PATENT AND TRADEMARK OFFICE
CERTIFICATE OF CORRECTION

PATENT NO. : 8,546,759 B2
APPLICATION NO. : 10/587384
DATED : October 1, 2013
INVENTOR(S) : Skultety-Betz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 400 days.

Signed and Sealed this
Fifteenth Day of September, 2015

Michelle K. Lee
*Director of the United States Patent and Trademark Office*